(12) United States Patent
Uhlik et al.

(10) Patent No.: US 7,679,604 B2
(45) Date of Patent: *Mar. 16, 2010

(54) METHOD AND APPARATUS FOR CONTROLLING A COMPUTER SYSTEM

(76) Inventors: Christopher R. Uhlik, 345 Love La., Danville, CA (US) 94526; John T. Orchard, 2127 Cornell St., Palo Alto, CA (US) 94306

( * ) Notice: Subject to any disclaimer, the term of this patent is extended or adjusted under 35 U.S.C. 154(b) by 786 days.

This patent is subject to a terminal disclaimer.

(21) Appl. No.: 11/497,567

(22) Filed: Jul. 31, 2006

(65) Prior Publication Data

US 2007/0021930 A1    Jan. 25, 2007

Related U.S. Application Data

(63) Continuation of application No. 11/013,654, filed on Dec. 15, 2004, which is a continuation of application No. 09/823,221, filed on Mar. 29, 2001, now Pat. No. 6,834,249.

(51) Int. Cl.
*G09G 5/08*    (2006.01)
(52) U.S. Cl. .................. 345/158; 345/156; 345/173
(58) Field of Classification Search .............. 345/87, 345/156–158, 164–166, 169, 901–903, 173; 700/17, 28, 46, 83; 379/433.04; 382/276; 702/150–151
See application file for complete search history.

(56) References Cited

U.S. PATENT DOCUMENTS

| | | | |
|---|---|---|---|
| 4,214,485 A | 7/1980 | Berger et al. | |
| 5,128,655 A | 7/1992 | Shore | |
| 5,797,105 A | 8/1998 | Nakaya et al. | |
| 6,025,830 A | 2/2000 | Cohen | |
| 6,112,141 A | 8/2000 | Briffe et al. | |
| 6,242,743 B1 | 6/2001 | DeVito | |
| 6,347,290 B1* | 2/2002 | Bartlett | 702/150 |
| 6,357,939 B1 | 3/2002 | Baron | |
| 6,369,794 B1 | 4/2002 | Sakurai et al. | |
| 6,385,351 B1 | 5/2002 | Simske et al. | |
| 6,396,497 B1 | 5/2002 | Reichen | |
| 6,567,101 B1 | 5/2003 | Thomas | |
| 6,834,249 B2 | 12/2004 | Orchard | |
| 7,184,020 B2 | 2/2007 | Matsui | |
| 7,271,795 B2 | 9/2007 | Bradski | |
| 2004/0169636 A1 | 9/2004 | Park | |

* cited by examiner

*Primary Examiner*—Richard Hjerpe
*Assistant Examiner*—Mansour M Said
(74) *Attorney, Agent, or Firm*—Stolowitz Ford Cowger LLP

(57) ABSTRACT

A handheld computing device is introduced comprising a motion detection sensor(s) and a motion control agent. The motion detection sensor(s) detect motion of the computing device in one or more of six (6) fields of motion and generate an indication of such motion. The motion control agent, responsive to the indications of motion received from the motion sensors, generate control signals to modify, one or more of the operating state and/or the displayed content of the computing device based, at least in part, on the received indications.

32 Claims, 7 Drawing Sheets

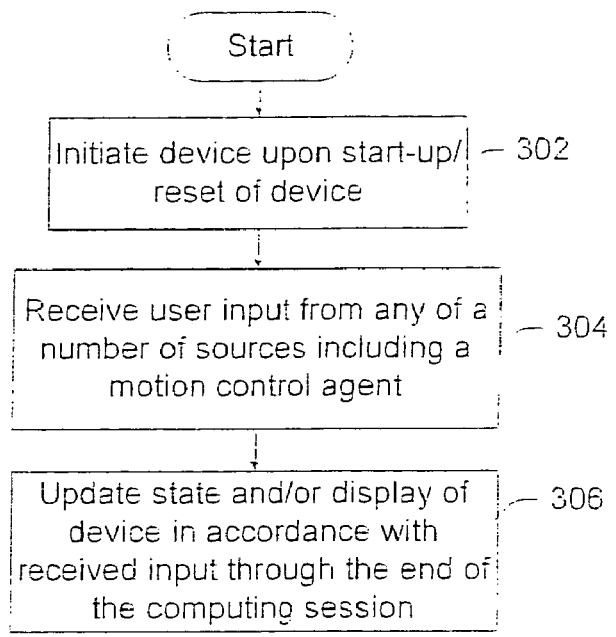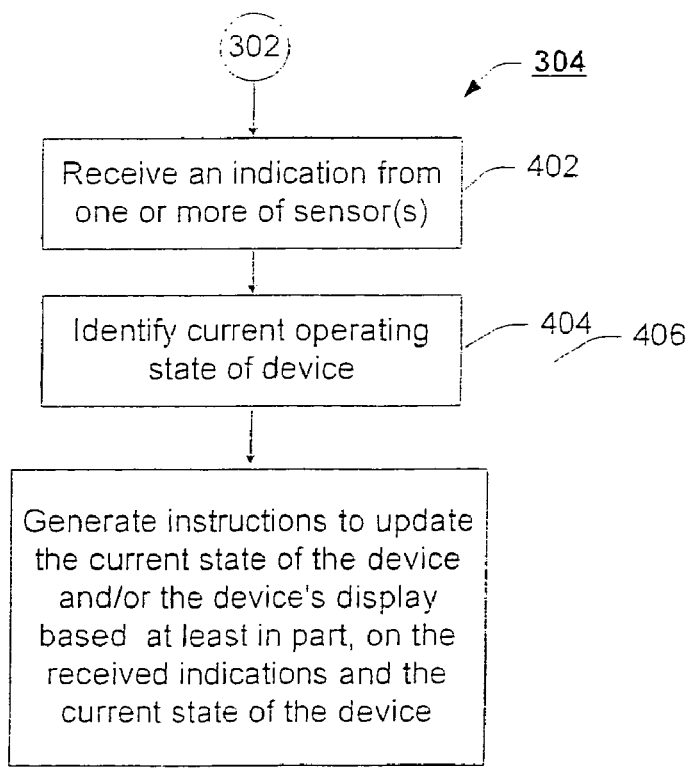

METHOD AND APPARATUS FOR CONTROLLING A COMPUTER SYSTEM

CROSS-REFERENCE TO RELATED APPLICATION

This application is a continuation of U.S. patent application Ser. No. 11/013,654 filed on Dec. 15, 2004, which is a continuation of U.S. patent application Ser. No. 09/823,221 filed on Mar. 29, 2001 (now U.S. Pat. No. 6,834,249 issued Dec. 21, 2004), all hereby incorporated herein by reference.

TECHNICAL FIELD

This invention generally relates to the field of user interfaces and, more particularly, to a method and apparatus for controlling a computing device.

BACKGROUND

Recent advances in computing power and related technology have fostered the development of a new generation of powerful software applications. Gaming applications, communications applications, and multimedia applications have all benefited from increased processing power and clocking speeds. Despite these recent advances, however, the user interface for most computing systems dates back nearly thirty (30) years, i.e., utilizing a keyboard and pointing device to interface with and control certain aspects of the computing environment. These user interface devices are often cumbersome and non-intuitive at best, and may well lead to repetitive motion injuries and are unusable by a significant population of potential computer users at worst. While inconvenient and non-enabling in a desktop environment, such conventional user interface devices may well be dangerous in a mobile, handheld environment.

Despite these problems, many of the conventional mobile computing platforms. e.g., personal digital assistants (PDA), electronic books (or, eBooks), portable communication devices (cell phones, pagers, and the like), portable gaming appliances, and the like inherited similar user interface devices. That is, these mobile computing devices typically rely upon manual buttons, touchscreens, trackpads, trackballs and other traditional pointing devices to control the state of the device and/or the display of content generated by an application. As in the case of the desktop systems, these user interface devices are typically cumbersome to varying degrees as they often require two hands to operate (e.g. touchscreens, track-pads, and track-balls), or do not provide a simple way to control the state of an application and/or the display of content generated within an application.

Thus, a method and apparatus for controlling a computing system is presented, unencumbered by the deficiencies and limitations commonly associated with the prior art.

SUMMARY

A method and apparatus for controlling a computing system is presented. In accordance with a first embodiment of the present invention, a handheld computing device is introduced comprising a motion detection sensor(s) and a motion control agent. The motion detection sensor(s) detect motion of the computing device in one or more of six (6) fields of motion and generate an indication of such motion. The motion control agent, responsive to the indications of motion received from the motion sensors, generate control signals to modify one or more of the operating state and/or the displayed content of the computing device based, at least in part, on the received indications.

BRIEF DESCRIPTION OF THE DRAWINGS

The present invention is illustrated by way of example, and not necessarily by way of limitation in the figures of the accompanying drawings in which like reference numerals refer to similar elements.

FIG. 3 illustrates a flow chart of an example method facilitating user control of a computing system, in accordance with the teachings of the present invention;

FIG. 4 depicts a flow chart of an example method for controlling a computing system by physically manipulating the computing system, in accordance with one example embodiment of the present invention;

DETAILED DESCRIPTION

This invention concerns a method and apparatus for controlling the display of a computing system. According to one aspect of the present invention, personal computing devices are provisioned with a motion control agent which, in response to input from one or more motion detection sensor(s) coupled to the motion control agent, issues display control commands to a display control device. Those skilled in the art will appreciate that the introduction of the innovative motion control agent into such computing devices as, for example, a personal digital assistant (PDA), an electronic book (eBook) appliance, personal communication devices, portable gaming devices and the like enables a user to intuitively control the state and/or displayed content of a computing device without the conventional need of pressing button(s), or manipulating a trackpad, trackball, etc. In this regard, the motion control agent represents a new paradigm in user control of computing systems.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Computing System

Figure 1:
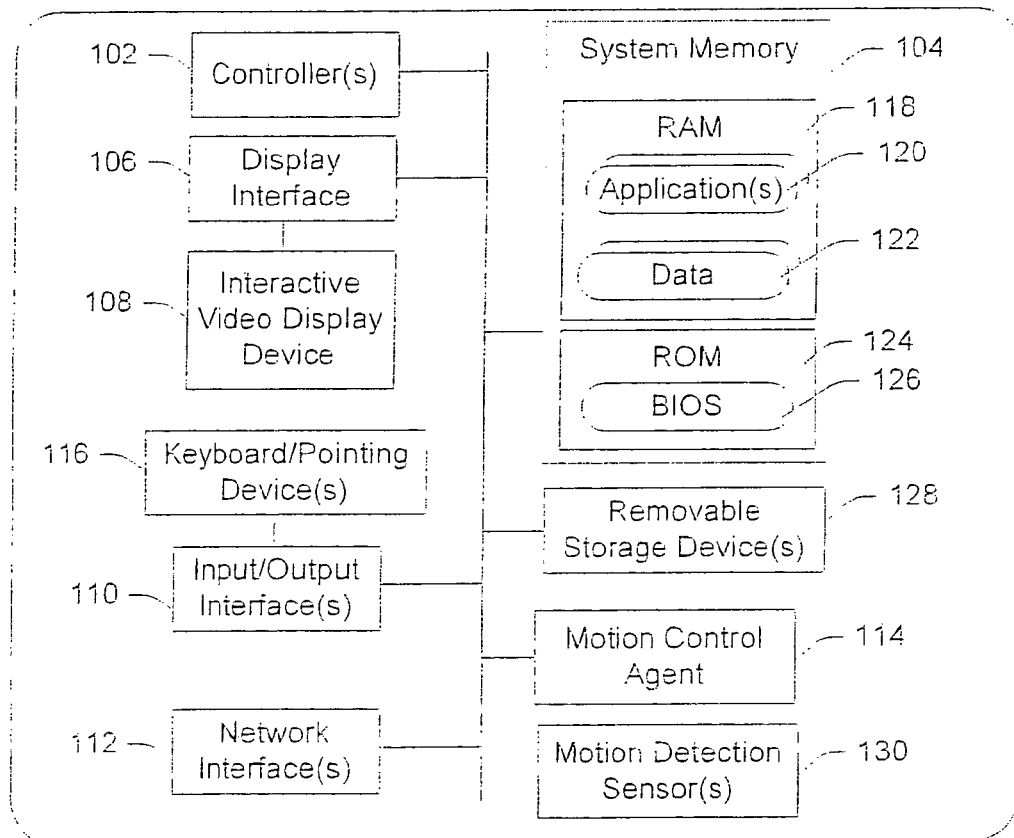
FIG. 1 is a block diagram of a computing system including a motion control agent, according to one example embodiment of the present invention.

FIG. 1 illustrates a block diagram of an example computing system within which the teachings of the present invention may be practiced, in accordance with one example embodiment of the present invention. In accordance with the illustrated example embodiment of FIG. 1, a computing system 100 is depicted comprising one or more controller(s) 102, system memory 104, a display interface 106, a video display device 108, input/output (I/O) interface(s) 110, network interface(s) 112 and an innovative motion control agent 114 responsive to one or more motion detection sensor(s) 116, each coupled as shown. In addition to the foregoing, computing system 100 is depicted comprising mass storage devices(s) 128 and one or more conventional keyboard/pointing devices 130, each coupled as depicted. In accordance with the teachings of the present invention, to be developed more fully below, motion control agent 114 generates control signals to control one or more of the operational state and/or the display content of the computing device based, at least in part, on indication(s) of motion received from the one or more motion detection sensor(s) 116. In this regard, a user of computing device 100 can intuitively control the operating state and/or display content of the computing device without resorting to the conventional I/O means of a keyboard and/or pointing device(s) (130) such as a touchpad, trackball, and the like.

As shown, system memory 104 is depicted comprising computer readable medium including a volatile memory such as random access memory (RAM) 118, and a non-volatile memory such as read-only memory (ROM) 124. RAM 118 is depicted comprising applications 120 and/or data that are immediately accessible to and/or available for operation on by control logic, e.g., controller(s) 102. ROM 124 is depicted comprising a basic input/output system (BIOS) 126 comprising a rudimentary set of routines that help to transfer information between elements within computing device 100 prior to execution of an operating system, e.g. during start-up or reset periods.

Controller(s) 102 implements an operating system (e.g., within applications 120) and selectively executes other applications 102 in response to user interaction with the computing device. In accordance with one aspect of the present invention, in addition to conventional means of control, controller 102 is responsive to control signals generated by motion control agent 114 to control the operational state and/or display content of the computing device 100. But for its interaction with motion control agent 114, controller 102 is intended to represent any of a wide variety of control logic means known in the art such as, for example, a microprocessor, a special purposes controller, a general purpose controller, an application specific integrated circuit (ASIC), a programmable logic device (PLD), a field-programmable gate array (FPGA), and the like.

Input/output (I/O) interface(s) 110 enable input and output devices to interact with the computing device 100 in general, and controllers within the computing device in particular. As shown, I/O interface(s) 110 is coupled to conventional keyboard/pointing devices 130 to receive user input from such devices and generate control signals for use by the controller(s) 102 in response to user interaction with the devices. Similarly, motion control agent 114 generates control signals for use by the controller(s) 102 in response to user interaction with (i.e. movement of) the computing device.

According to one implementation, motion control agent 114 is integrated within I/O interface(s) 110, wherein the motion detection sensor(s) 116 provide indications of motion to the I/O interface(s) 110, which generates control signals to interact with controller(s) 102. But for such interaction with, or integration of motion control agent 114, I/O interfaces 110 are intended to represent a wide variety; of such interfaces known in the art such as, for example, a Universal Serial Bus (USB) interface, a Personal Computing Interface (PCI) bus interface, a serial bus interface, a parallel bus interface, an infrared interface, a radio frequency (RF) interface, and the like.

As used herein but for their interaction with motion control agent 114, each of the displays interface 106 and associated display device 108, network interface(s) 112, mass storage device(s) 128 and conventional user I/O devices 130 are each intended to represent such elements as they are commonly known in the art.

Motion control agent 114, as introduced above and will be developed more fully below, generates control signals to controller(s) 102 to modify an operational state and/or display content of the computing device 100 in response to user interaction with the computing device 100. More particularly, motion control agent 114 issues such control signals in response to indications received from one or more motion detection sensor(s) 116. The motion control sensor(s) 116 the physical movement of the computing device 100 in one or more of six (6) fields of motion, i.e., in each of the x-, y- or z-planes, as well as rotational motion about each of the x-, y-, or z-axes. In accordance with one example implementation, when an indication of rotational movement is detected from one or more of the sensor(s) 116, an indication of a complementary motion is required before the motion control agent 114 issues a control signal. In this regard, motion control agent 114 facilitates rotational control of the computing device, awhile providing the user with the opportunity, to return the device to a proper viewing position after the rotational control.

In accordance with one implementation, motion control agent 114 identifies a current operating state of the computing device, e.g., whether the operating system or another application has operational control over the display 108 of the computing device 100, and generates control signals in accordance with the operational state and the received indication(s) of motion. That is, the motion control signal generated by motion control agent 114 in response to a particular motion differs if the display device is controlled by the operating system or another application. As will be developed more fully below, motion control agent 114 issues control signals to move an highlighted, active region of an operating system graphical user interface from one icon to another in a direction denoted by user movement of the computing device if the operating system has operational control over the displays 108. An application associated with an icon is selectively invoked in response to control signals generated by motion control agent 114 in response to user movement of the computing device in a particular way. In accordance with one aspect of the invention, motion control agent 114 selectively generates a user interface that enables a user of the computing device to define how the motion control agent 114 responds to certain user movements of the computing device. In this regard, motion control agent 114 provides a flexible I/O solution.

Motion detection sensor(s) 116 generate an indication denoting motion in one or more of six (6) fields of motion. In this regard, motion detection sensors 116 are intended to represent any of a wide variety of such devices with the physical dimensions to be integrated with our exemplary computing devices. Examples of suitable motion detection sensor(s) 116 include micro-accelerometers, liquid-metal switches (e.g., a mercuric switch), micro-machined gyroscopes, and the like. It will be appreciated by those skilled in the art that the complexity of the sensor(s) 116 utilized in a particular implementation may well dictate the number of sensor(s) required to provide functionality, in all six planes of movement. That is, multiple mercury switches may well be required to provide such functionality, while a single micro-accelerometer or micro-machined gyroscope may well provide the necessary functionality. Any combination of one or more of such devices may well be utilized without deviating from the spirit and scope of the present invention.

It will be appreciated by, those skilled in the art that, although illustrated as a plurality of disparate functional elements, one or more of the elements 102-130 may resell be combined into multi-functional elements. In accordance with one alternate example implementation, for example, a motion control agent 114 wraith one or more integrated motion detection sensor(s) 116 is envisioned. In yet another example implementation, motion control agent 114 is implemented as a series of executable instructions within application(s) 120, selectively invoked by controller(s) 102 to implement the teachings of the present invention. In this regard, computing system 100 is merely intended to illustrate one embodiment of the present invention, as other embodiments of greater or lesser complexity may be developed without deviating from the scope and spirit of the present invention.

Accordingly, but for the introduction of the innovative motion control agent 114 and associated motion detection sensor(s) 116, computing system 100 is intended to represent any of a wide variety of computing systems known in the art.

Example Motion Control Agent

Figure 2:
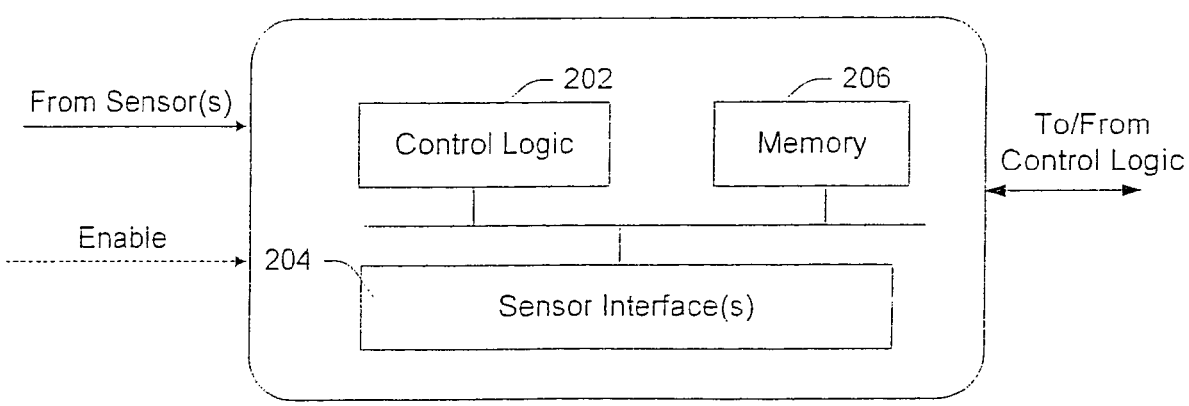
FIG. 2 is a block diagram of an example motion control interface, according to one embodiment of the present invention.

Having introduced the operating environment of the present invention, above, attention is now directed to FIG. 2 wherein a block diagram of an example motion control agent 114 is presented, in accordance with one example embodiment. In accordance with the illustrated example implementation of FIG. 2, motion control agent 114 is presented comprising control logic 202, one or more motion detection sensor interface(s) 204 and memory 206, each coupled as shown. As shown, motion control agent 114 receives motion indication(s) from one or more sensor(s) and interacts with control logic (e.g. 102) of a host computing device (e.g. 100) to control the operational state and/or display content of the computing device. In addition, in certain implementations, the function of motion control agent 114 is controlled by a user through the use of an enable button that, when depressed, provides an enable indication to the motion control agent. In alternate embodiments, motion control agent 114 relies on a motion threshold of the motion detection sensor(s) to ensure that random movements of the device does not result in a motion indication, thereby affecting the operational state and/or display content of the device. Although illustrated in accordance with a hardware implementation, those skilled in the art will appreciate that motion control agent 114 may well be implemented as a series of executable instructions (e.g., an application 120) to implement the functions described below. In this regard, the block diagram of FIG. 2 is merely illustrative of one embodiment of the functional elements of the motion control agent, and not a limitation thereof.

As introduced above, motion control agent 114 interacts with other control logic (e.g., controllers 202) to control one or more of an operational state and/or display content of the computing device. In this regard, motion control agent 114 includes control logic 202 to perform this interfacing function. More particularly control logic 202 issues control signals to other control logic to control the operational state and/or displays content of the computing device 100 in response to indications of motion received from motion detection sensor(s) 116 and with regard to a current operational state of the computing device. Accordingly, control logic 202 interacts with controllers 202 to identify, the current operational state of the computing device 100, e.g., whether the operating system or another application has operational control over the display 108. Based, at least in part, on the current operational state of the computing device and in response to received indications of motion, control logic 202 selects one or more control signals from a plurality of control signals resident within the control logic 202 or memory 206 to issue to other control logic (102) of the computing device.

Sensor interface(s) 204 enable each of the one or more types of motion detection sensor(s) 116 to provide indications of motion to motion control agent 114. Examples of such interfaces include a control bus, a direct-memory access (DMA) line to control logic 202, a single control line, an $I^2C$ bus, and the like.

As used herein, memory 206 is utilized by control logic 202 to store and maintain operational information and control signal information associated with one or more computing devices. According to one implementation, introduced above, control logic 202 receives information regarding a current operational state of the computing device, wherein such information is stored and maintained in memory 206. In addition, memory 206 is used to store information used by control logic 202 to translate information received from one or more of a wide variety of motion detection sensor(s) into control signal(s) for any of a wide variety of computing device platforms. In this regard, motion control agent 114 is flexible and readily adaptable for use in a wide variety of computing device platforms. But for its use within and interaction with motion control agent 114, memory 206 is intended to represent any of a wide variety of memory means known in the art.

Example Operation and Implementation

Having introduced the functional and architectural elements of an example embodiment of the innovative motion control agent 114 with reference to FIGS. 1 and 2, an example operation and implementation will be further developed with reference to FIGS. 3 through 11. For ease of illustration, and not limitation, the operational detail of the motion control agent 114 will be further developed in accordance with the example implementation context of a personal digital assistant (PDA) computing environment. In accordance with such an example implementation, the computing system 100 of FIG. 1 represents a PDA endowed with the innovative motion control agent 114 and associated motion detection sensors 116. Nonetheless, it will be appreciated bar those skilled in the art that computing devices of greater or lesser complexity which utilize a motion control agent so control the state and/or displays content of a computing device fall within the spirit and scope of the claims appended hereto.

Turning to FIG. 3, a flow chart of an example method facilitating user control of a computing system is depicted, in accordance with the teachings of the present invention. In accordance with the illustrated example implementation of FIG. 3, the method begins with block 302 upon initiation of the device during start-up or a reset condition. That is, as with conventional I/O means, the motion control agent 114 is selectively invoked upon start-up or reset of the computing device 100 to facilitate control of the device through a user's physical movement of the PDA.

In block 304, control logic 102 of the PDA receives user input from an of a number of I/O sources including motion control agent 114. That is to say, integration and initiation of the innovative motion control agent 114 does not disable an), of the other I/O means available to the user. In certain instances and applications, control of the operational state and/or displays content of the PDA is more conveniently performed wraith traditional I/O devices 130 such as a trackball, stylus, and the like. In accordance with the teachings of the present invention, as introduced above, computing device 100 is endowed with motion control agent 114, which generates control signal representations of user input for transmission to control logic 102 based, at least in part, on the current operational state of the PDA 100 and received indications of motion of the PDA 100 generated by motion detection sensor(s) 116. An example method for controlling the operational state and/or the display content of a computing device (100) is further illustrated with reference to FIG. 4, below.

In block 306, in response to such user input (block 304), control logic 102 updates the operational state and/or display content of the PDA 100 in accordance with received input through the end of the computing session.

FIG. 4 depicts a flow chart of an example method for controlling a computing system by physically moving and manipulating the computing system, in accordance with one example embodiment of the present invention. In accordance with the illustrated example implementation of FIG. 4, the method begins with block 402, wherein motion control agent 114 receives an indication of movement from one or more motion detection sensor(s) 116 via sensor interface(s) 204. In accordance with one example implementation, introduced above, PDA 100 includes one or more motion detection sensor(s) to provide an indication of motion specifically denoting six (6) fields of motion, i.e., movement of the PDA 100 in the x-, y- and z-planes as well as rotational movement of the PDA 100 about the x-, y- and z-axes. According to one example implementation, introduced above, the motion detection sensor(s) 116 may use a motion threshold that must be reached before the motion indications are sent to the motion control agent. In alternate implementations, the computing device 100 may well include an "enable button" that, when depressed by the user enables the motion control agent 114 to respond to motion indications received by the agent 114. In accordance wraith one example implementation, motion control agent 114 includes, or has access to memory comprising a listing of control signals associated with indications of movement in each of the six fields based, at least in part, on the current operational state of the PDA 100.

Accordingly, in block 404, motion detection agent 114 identifies the current operational state of the PDA 100. More particularly, control logic 202 periodically receives an update on the operational state of the computing device from controller(s) 102. In accordance with one example, control logic 202 receives such updates whenever there is a state change of the computing device. In alternate implementations, control logic 202 queries controller 102 for the current operational state. As introduced above, the current operational state is stored and maintained by control logic 202 in memory 206.

In block 406, motion control agent 114 generates instructions to update the current state of the device and/or the display content of the device based, at least in part on the received indication(s) and the current state of the device. More particularly, in response to motion indications received from one or more sensor(s) 116 via sensor interface(s) 204, control logic 202 accesses memory 206 and, depending on the current operational state of the PDA 100 denoted in memory 206, generates an appropriate control signal(s) for controller(s) 102 to update the operational state and/or displays content of the device.

If, for example, the PDA 100 is currently displaying the operating system GUI, select movements of the PDA 100 cause motion detection agent 114 to generate control signals to move a highlighted, active region of the display to move from one icon to another in accordance with the direction of the movement. Certain other movements cause motion detection agent 114 to generate control signals to launch an application associated with an icon contained within the highlighted active region of the display.

If, for example, the PDA 100 is implementing an application, certain movements of the PDA 100 cause motion detection agent 114 to generate control signals to display a subsequent page of content, display a previous page of content, scroll a page of content, and/or zoom in/out of the displayed page of content. An example of PDA movements and the associated display response are illustrated in FIGS. 5-11, below.

Graphical Illustration(s) of Motion Control of a Computing Device

Figure 5:
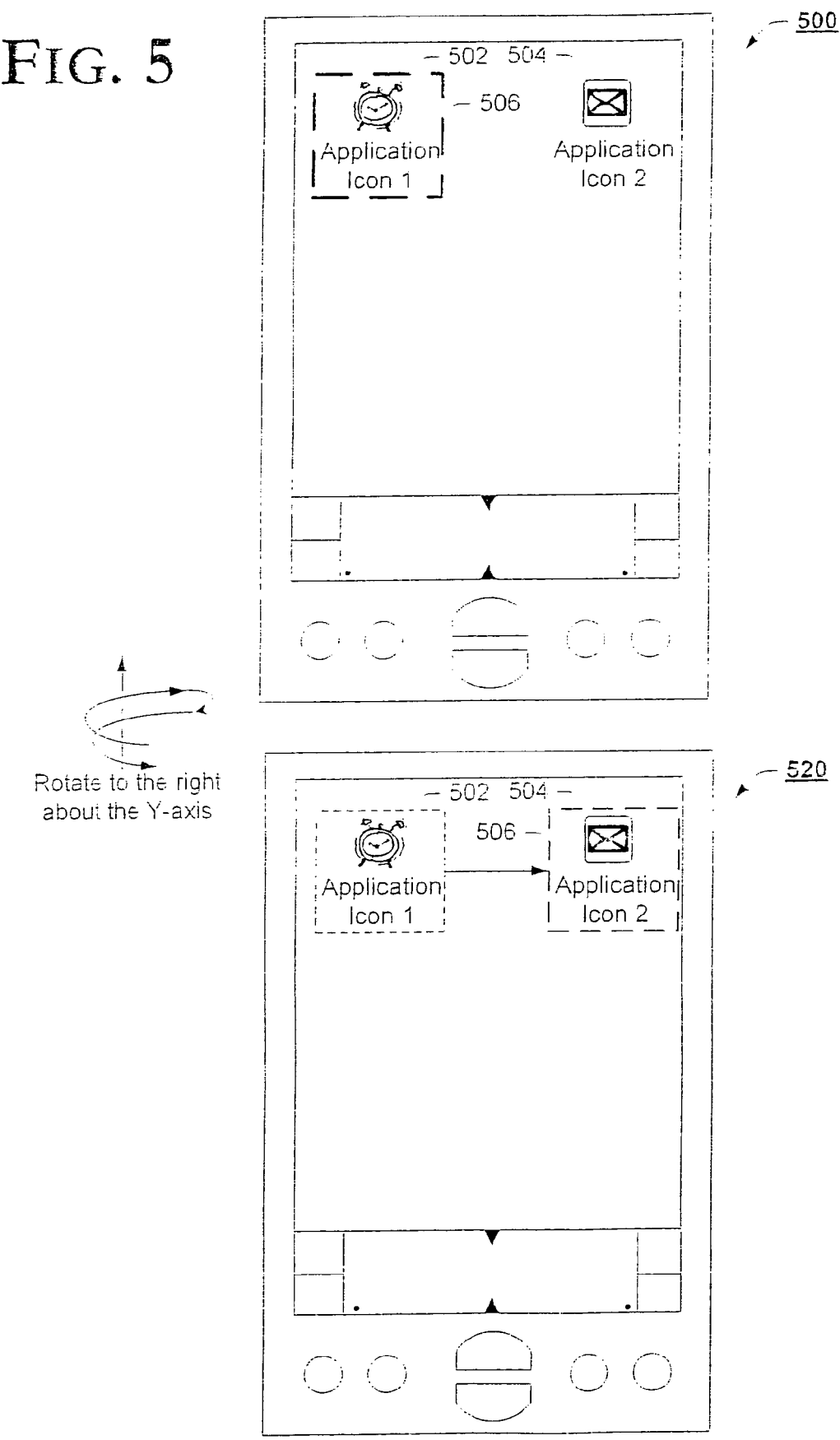
FIG. 5 graphically illustrates control of an operating system (OS) graphical user interface (GUI) to control the state of a computing system using motion control, in accordance with one aspect of the present invention.

FIG. 5 graphically illustrates an example implementation of using motion control to affect the operating system (OS) graphical user interface (GUI) to control the state of a computing system, in accordance with one aspect of the present invention. In accordance wraith the illustrated example implementation of FIG. 5, an operating system (O/S) graphical user interface (GUI) is depicted 500 for a PDA (e.g., 100) comprising two (2) icons 502, 504, each associated with a unique application available for invocation and execution by the PDA. As shown in display 500, one of the icons 502 is currently selected within a highlighted, active region 506. By rotating the PDA 100 to the right about the Y-axis, and back again (a complementary motion back to the original viewing position), motion control agent 114 generates instructions (e.g., to controller 102) to update display 500 to that of 520. More particularly, the highlighted active region 506 is moved one icon to the right (i.e., in the direction of the rotation). Similarly, rotation to the left about the y-axis (and a complementary motion back again) causes motion control agent 114 to generate control signals to controller 102 to send the highlighted active region back one incremental icon to icon 502. Similar movements about the x-axis would move the highlighted active region up or down in the active display. In accordance with one implementation, rotation about the z-axis (and a complementary motion back to the starting position) causes motion control agent 114 to issue control signals to controller 102 to launch the application associated with the icon in the highlighted, active region 506. In this regard, motion control agent 114 provides an intuitive means of interacting with an operating system of a computing device to control the operational state of the device.

Turning next to FIGS. 6-11, similar graphical illustrations are presented which depict motion control of displayed content of an application, in accordance with one embodiment of the present invention. More particularly. FIGS. 6-11 illustrate resulting updates to displayed content of an application resulting from certain movements of the PDA 100 by the user. For purposes of illustration, assume that the application is an electronic book (eBook) that the user is reading. Rather than using convention input devices to scroll, zoom, paginate the book, a PDA 100 endowed with motion control agent 114 facilitates an intuitive motion control of the application by physically manipulating the electronic device executing the ebook application.

Figure 6:
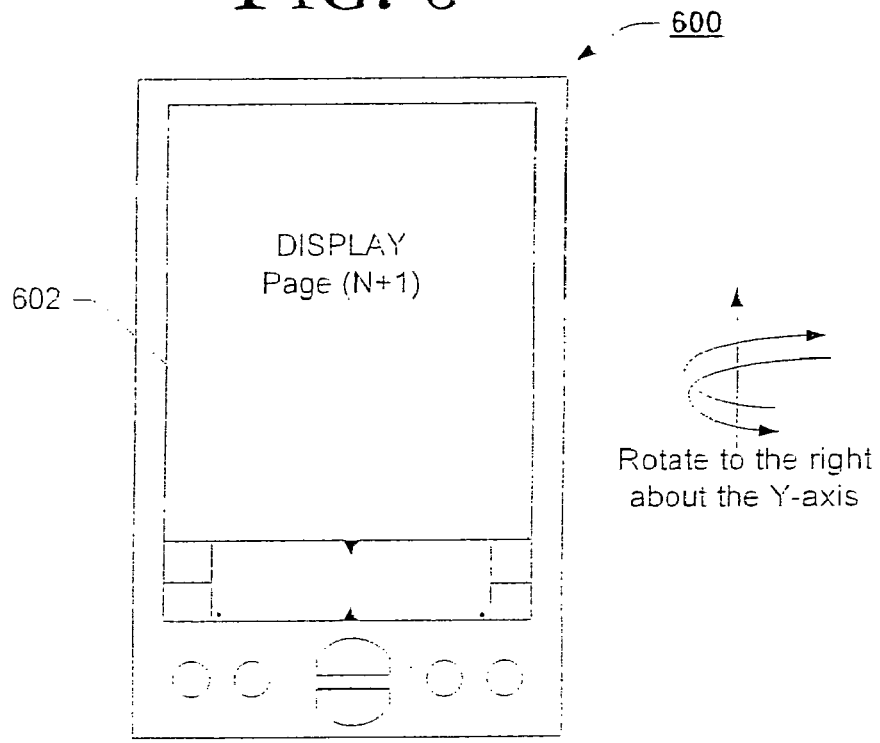
FIGS. 6-11 graphically illustrate motion control of the computing system's display of content associated with an executing application, in accordance with another aspect of the present invention.

FIG. 6 graphically illustrates updating the display 600 of the PDA 100 to display a subsequent page of the eBook. In accordance with the teachings of the present invention, two alternate means may be employed. In a first, a user slides the PDA 100 to the right in the x-plane to step to the next page. Alternatively, a rotational motion to the right about the y-axis, with a complementary motion back (to the left) about the y-axis to the starting point also steps to the next page. In either case, upon the assertion of an enable button and/or once a motion threshold of one or more sensor(s) is reached, the sensor(s) 116 generate an indication of such motion for motion control agent 114, which issues control signals (e.g., to controller 102) to update the display content. In response, the display 108 is updated to reflect Page (N+1) 602.

Figure 7:
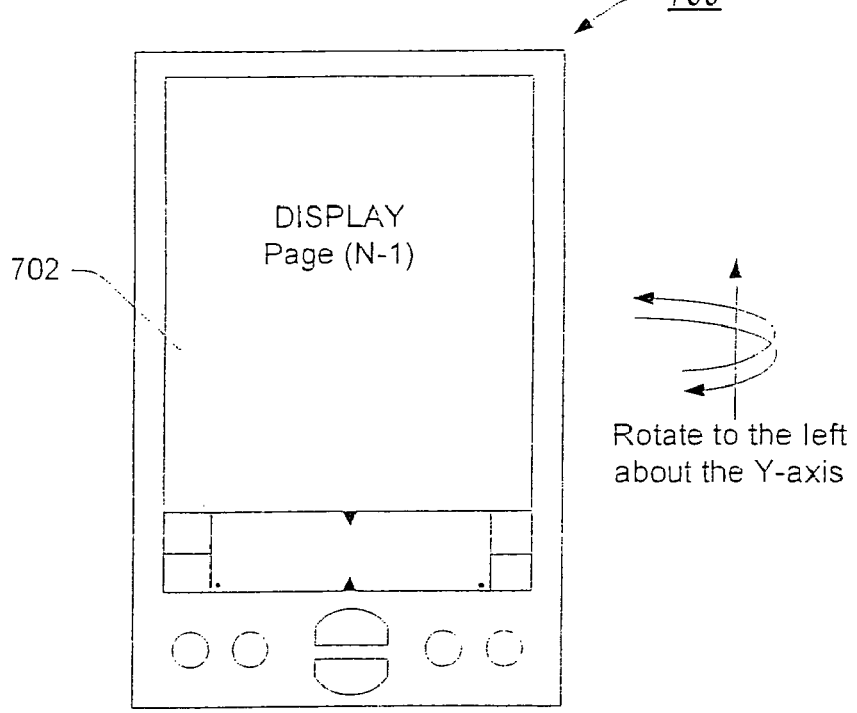

FIG. 7 graphically illustrates updating the display 700 of the PDA 100 to display a previous page of the eBook. In accordance with the teachings of the present invention, two alternate means may be employed. In a first, a user slides the PDA 100 to the left in the x-plane to step to the next page. Alternatively, a rotational motion to the left about the y-axis, with a complementary motion back (to the right) about the y-axis to the starting point also steps to the next page. In either case, upon the assertion of an enable button and/or once a motion threshold of one or more sensor(s) is reached, the sensor(s) 116 generate an indication of such motion for motion control agent 114, which issues control signals (e.g. to controller 102) to update the displays content. In response, the display 108 is updated to reflect Page (N−1) 702.

Figure 8:
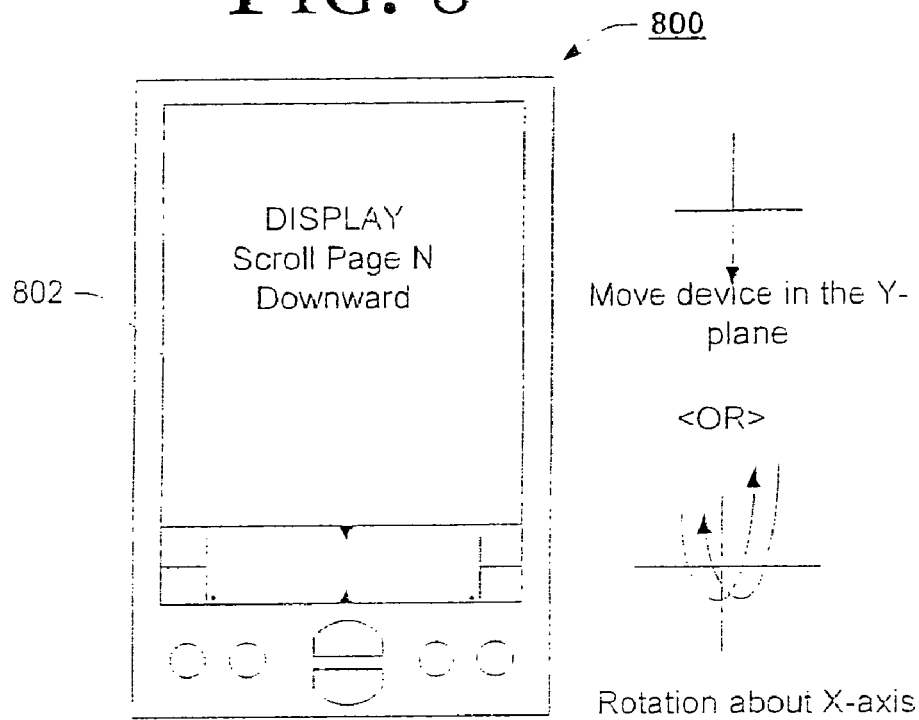

FIG. 8 graphically illustrates updating the display 800 of the PDA 100 to scroll downward within a displayed page of an eBook application. In accordance with the teachings of the present invention, two alternate means may be employed. In a first, a user slides the PDA 100 downward in the y-plane to effect the scroll. Alternatively, a rotational motion upward and forward about the x-axis, with a complementary motion back (downward and backward) about the x-axis to the starting point also scrolls the page. In either case, upon the assertion of an enable button and/or once a motion threshold of one or more sensor(s) is reached, the sensor(s) 116 generate an indication of such motion for motion control agent 114, which issues control signals (e.g., to controller 102) to update the displays content. In response, the display 108 is updated to reflect Page N 802.

Figure 9:
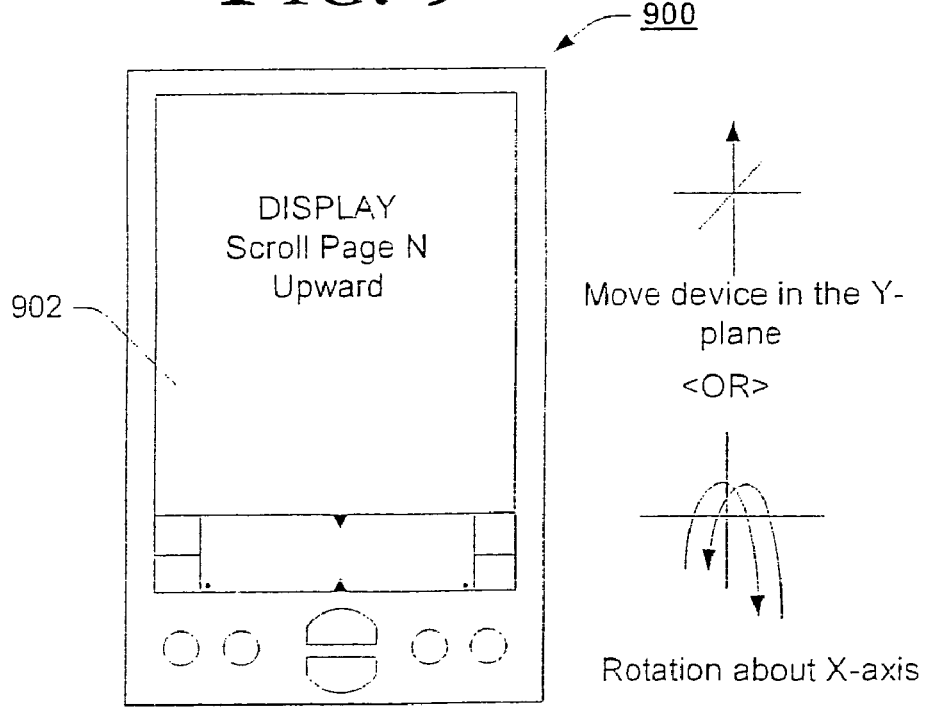

FIG. 9 graphically illustrates updating the display 900 of the PDA 100 to scroll upward within a displayed page of an eBook application. In accordance with the teachings of the present invention, two alternate means may be employed. In a first, a user slides the PDA 100 upward in the y-plane to effect the scroll. Alternatively, a rotational motion downward and backward about the x-axis, with a complementary motion back (upward and forward) about the x-axis to the starting point also scrolls the page. In either case, upon the assertion of an enable button and/or once a motion threshold of one or more sensor(s) is reached, the sensor(s) 116 generate an indication of such motion for motion control agent 114, which issues control signals (e.g., to controller 102) to update the displays content. In response, the display 108 is updated to reflect Page N 902.

Figure 10:
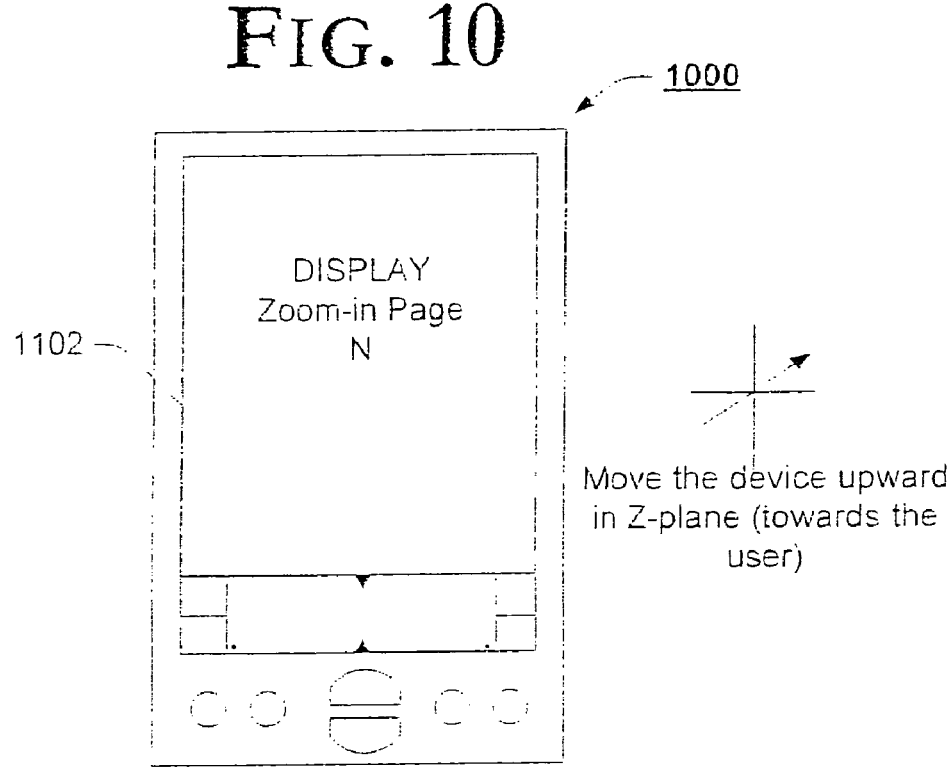

FIG. 10 graphically illustrates updating the display 1000 of the PDA 100 to zoom-in on content within a displayed page of an eBook application. In accordance with one example implementation, a user moves the device upward in the z-plane (e.g., towards the user), to effect the zoom. Upon the assertion of an enable button and/or once a motion threshold of one or more sensor(s) is reached, the sensor(s) 116 generate an indication of such motion for motion control agent 114, which issues control signals (e.g., to controller 102) to update the display content. In response, the display 108 is updated to reflect Page N 1002.

Figure 11:
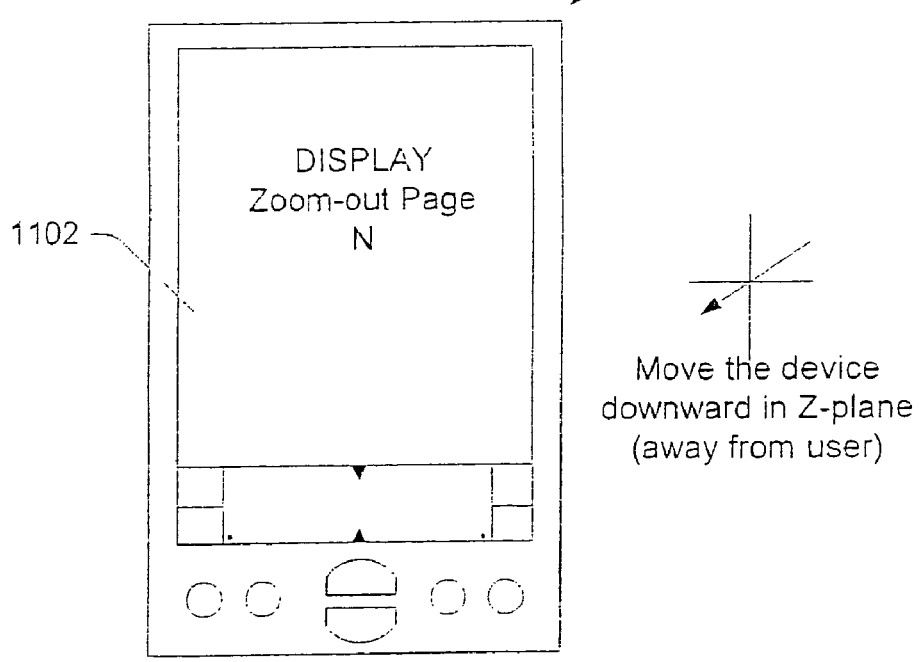

FIG. 11 graphically illustrates updating the display 1100 of the PDA 100 to zoom-out on content within a displayed page of an eBook application. In accordance with one example implementation, a user moves the device downward in the z-plane (e.g., away from the user), to effect the zoom. Upon the assertion of an enable button and/or once a motion threshold of one or more sensor(s) is reached, the sensor(s) 116 generate an indication of such motion for motion control agent 114, which issues control signals (e.g., to controller 102) to update the display content. In response, the display 108 is updated to reflect Page N 1102.

Alternate Embodiments

Figure 12:
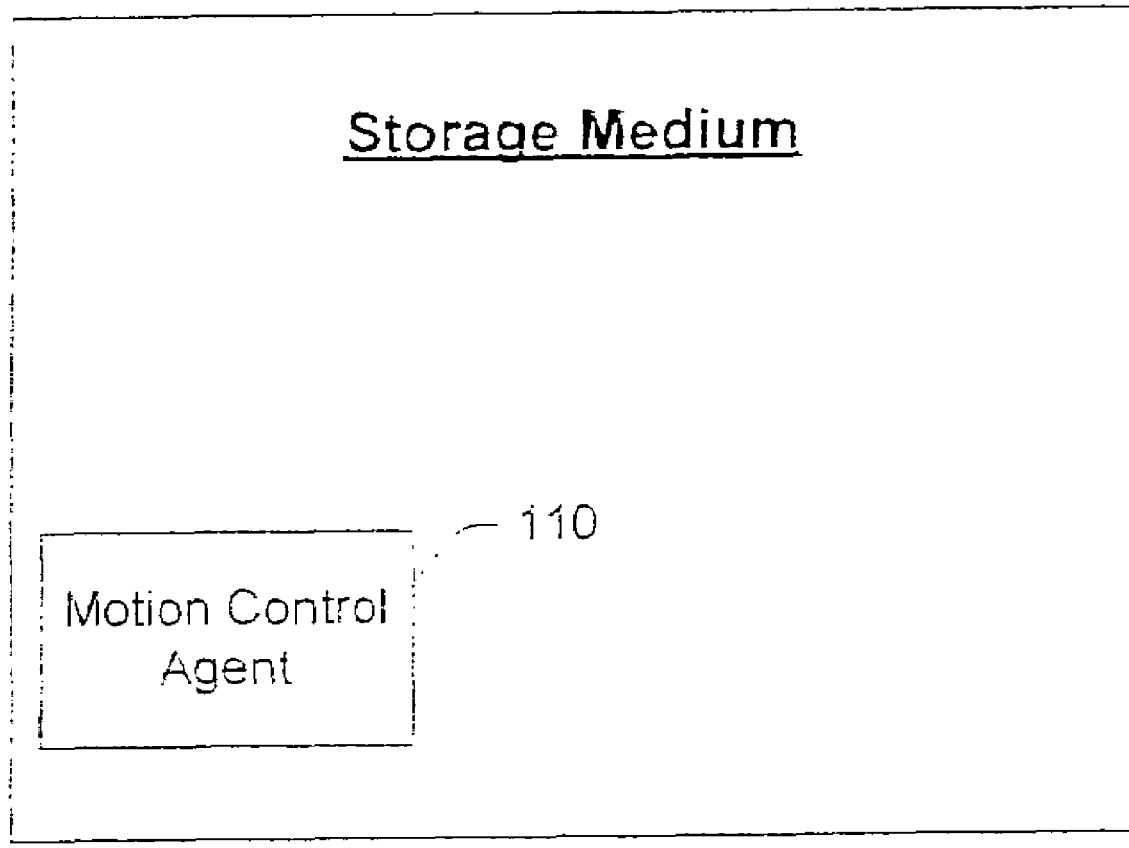
FIG. 12 is a graphical illustration of an example storage medium including instructions which, when executed, implement a motion control interface in a computing system.

FIG. 12 is a block diagram of a storage medium having stored thereon a plurality of instructions including instructions to implement the motion control agent 114, according to yet another embodiment of the present invention. In general, FIG. 12 illustrates a storage medium/device 1200 having stored thereon a plurality of machine-executable instructions including at least a subset of which that, when executed, implement the innovative motion control agent 114 of the present invention.

As used herein, storage medium 1200 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++. Visual Basic, Hypertext Markup Language (HTML), Java, eXtensible Markup Language (XML), and the like. Moreover, it is to be appreciated that the storage medium/device 1200 need not be co-located with any host system. That is, storage medium/device 1200 may well reside within a remote server communicatively coupled to and accessible by an executing system. Accordingly, the software implementation of FIG. 12 is to be regarded as illustrative, as alternate storage media and software embodiments are anticipated within the spirit and scope of the present invention.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

In accordance with the foregoing, we claim the following:

1. A method for controlling a computer device, the method comprising:
sensing an initial motion of said computer device in an initial direction, wherein the initial motion meets or exceeds an initial motion threshold;
sensing a complementary motion of said computer device in a reverse direction to the initial direction, wherein the complementary motion meets or exceeds a complementary motion threshold; and
generating at least one control signal configured to modify an operating state of the device or content being displayed by the device;
wherein sensing the initial motion and sensing the complementary motion occur before the generating the at least one control signal; and
wherein the initial or complementary motions comprise motion in one or more of at least six fields of motion including lateral x, y, or z motion or rotational x, y, or z motion.

2. The method as defined in claim 1 wherein sensing the initial or complementary motions includes sensing lateral motion in one or more of x, y, or z directions.

3. The method as defined in claim 2 wherein sensing the initial or complementary motions includes sensing rotational motion about one or more of an x, y, or z axis.

4. The method as defined in claim 1 wherein sensing the initial or complementary motions includes sensing rotational motion about one or more of an x, y, or z axis.

5. The method as defined in claim 1 further comprising receiving an enabling signal configured to enable said generating of at least one control signal.

6. The method as defined in claim 1 further comprising determining an operating state of the device.

7. The method as defined in claim 6 wherein the generating comprises generating the at least one control signal based, at least in part, on said determining the operating state of the device.

8. The method as defined in claim 7 wherein the determining the operating state of the device includes determining an operating system has operational control of the device or determining an application has operational control of the device.

9. The method as defined in claim 8 wherein the at least one control signal causes a highlighted active region displayed on the device to be moved from one icon to another icon.

10. The method as defined in claim 8 wherein the at least one control signal causes an application that is associated with an icon, which is displayed on the device and denoted by a highlighted active region, to be invoked.

11. The method as defined in claim 7 and further comprising modifying content displayed by the device by at least one of scrolling, zooming, or moving to a different displayed page.

12. A system, comprising:
a server including a storage medium, having stored thereon machine-executable instructions;
an executing system communicatively coupled to the server to execute at least a subset of the instructions stored on the server to implement a motion control agent, the motion control agent, if implemented, being configured to:
detect an initial motion of a handheld computing device in an initial direction, wherein the initial motion meets or exceeds an initial motion threshold;
detect a complementary motion of the handheld computing device in an alternate direction to the initial motion, wherein the complementary motion meets or exceeds a complementary motion threshold; and
generate control signals configured to modify an operating state or displayed content of the handheld computing device;
wherein the motion control agent is further configured to detect the initial and complementary motions before generating the control signals; and
wherein the motion control agent is further configured to detect the initial or complementary motions in one or more of at least six fields of motion, including lateral x, y, or z motion, or rotation about x, y, or z axis.

13. The system of claim 12, wherein the server comprises a remote server.

14. The system of claim 12, wherein the executing system is at least partially embodied on the handheld computing device.

15. The system of claim 12, wherein the motion control agent is configured to detect the initial or complementary motions via a motion sensor communicatively coupled to the handheld computing device.

16. The system of claim 15, wherein the motion sensor is selected from the group comprising: a micro-accelerometer, a mercury switch, a shock detector, and gyroscope.

17. The system of claim 12, wherein the handheld computing device is selected from the group comprising: a personal digital assistant (PDA), a personal gaming device, and a wireless communication device.

18. The system of claim 12, wherein the motion control agent is further configured to detects the initial or complementary motions in at least two of said six fields of motion.

19. The system of claim 12, wherein the control signals are further configured to modify the operating state or the displayed content of the handheld computing device responsive to the detected initial or complementary motions.

20. A computer-readable storage medium having stored thereon machine-executable instructions that, if executed by a device, cause the device to perform a method comprising:
detecting an initial motion of a handheld computing device in an initial direction, wherein the initial motion meets or exceeds an initial motion threshold;
detecting a complementary motion of the handheld computing device in an alternate direction to the initial direction, wherein the initial motion meets or exceeds a complementary motion threshold; and
generating at least one control signal configured to modify at least one of an operating state or to modify content displayed on the handheld computing device in accordance with said initial or complementary motions;
wherein detecting the initial and complementary motions occurs before the generating the at least one control signal; and
wherein the initial or complementary motions comprise motion in one or more of at least six fields of motion including lateral x, y, or z motion or rotation about an x, y, or z axis.

21. The computer-readable storage medium of claim 20, wherein the handheld computing device is a personal digital assistant (PDA), a personal gaming device, or a wireless communication device.

22. The computer-readable storage medium of claim 20, wherein the method further comprises determining the operating state of the handheld computing device.

23. The computer-readable storage medium of claim 22, wherein the method further comprises generating at least one control signal responsive to said determining the operating state.

24. The computer-readable storage medium of claim 20, wherein the method further comprises modifying at least one of the operating state or the content displayed on the handheld computing device by scrolling, zooming, or changing content displayed on the handheld computing device.

25. A device, comprising:
   a sensor configured to sense an initial motion of the device in an initial direction and configured to sense a complementary motion in an alternate direction to the initial motion, where the initial motion meets or exceeds an initial motion threshold and where the complementary motion meets or exceeds a complementary motion threshold; and
   a control circuit configured to generate at least one control signal after sensing the initial and complementary motions;
   where the at least one control signal is configured to modify an operating state of the device or alter content displayed by the device; and
   where the initial or complementary motions includes one or more of at least six fields of motion including a lateral x, y, or z motion or a rotational motion about an x, y, or z axis.

26. The device of claim 25 where the control circuit is configured to generate the at least one control signal responsive to an enable signal.

27. The device of claim 25 where the control circuit is configured to determine an operating state of the device.

28. The device of claim 27 where the control circuit is configured to operate responsive to the operating state of the device.

29. The device of claim 25 where the at least one control signal is configured to cause a highlighted active region displayed on the device to move from one icon to another icon.

30. The device of claim 29 where the at least one control signal is configured to invoke an application associated with an icon displayed on the device and denoted by a highlighted active region.

31. The device of claim 25 where the control circuit is configured to modify the content displayed by the device by scrolling, zooming, or moving to a different displayed page.

32. A device, comprising:
   means for sensing an initial motion of said device in an initial direction responsive to the initial motion meeting or exceeding an initial motion threshold;
   means for sensing a complementary motion of said device in an alternate direction to the initial direction responsive to the complementary motion meeting or exceeding a complementary motion threshold; and
   means for generating least one control signal configured to modify an operating state of the device or content being displayed by the device;
   wherein the means for sensing the initial motion and the means for sensing the complementary motion operate before the means for generating generates the at least one control signal; and
   wherein the initial or complementary motions comprise motion in one or more of at least six fields of motion including lateral x, y, or z motion or rotational x, y, or z motion.

* * * * *

UNITED STATES PATENT AND TRADEMARK OFFICE
CERTIFICATE OF CORRECTION

| | | |
|---|---|---|
| PATENT NO. | : 7,679,604 B2 | Page 1 of 1 |
| APPLICATION NO. | : 11/497567 | |
| DATED | : March 16, 2010 | |
| INVENTOR(S) | : Christopher R. Uhlik et al. | |

It is certified that error appears in the above-identified patent and that said Letters Patent is hereby corrected as shown below:

On the Title Page, Item (57) line 7 (Abstract):   Delete "modify," and replace with --modify--; and Column 14, line 19 (Claim 32):   Delete "least" and replace with --at least--.

Signed and Sealed this

Sixteenth Day of November, 2010

David J. Kappos
*Director of the United States Patent and Trademark Office*